(12) United States Patent
Barnett

(10) Patent No.: US 11,591,091 B2
(45) Date of Patent: Feb. 28, 2023

(54) PINCH POINT FREE ROTATABLE AIRCRAFT ARMREST

(71) Applicant: TRIODYNE SAFETY SYSTEMS, L.L.C., Northbrook, IL (US)

(72) Inventor: Ralph Lipsey Barnett, Wilmette, IL (US)

(*) Notice: Subject to any disclaimer, the term of this patent is extended or adjusted under 35 U.S.C. 154(b) by 0 days.

(21) Appl. No.: 17/472,967

(22) Filed: Sep. 13, 2021

(65) Prior Publication Data
US 2022/0348333 A1      Nov. 3, 2022

Related U.S. Application Data

(60) Provisional application No. 63/180,994, filed on Apr. 28, 2021.

(51) Int. Cl.
*B64D 11/06* (2006.01)
(52) U.S. Cl.
CPC ................ *B64D 11/0644* (2014.12)

(58) Field of Classification Search
CPC .................................................. B64D 11/0644
See application file for complete search history.

(56) References Cited

U.S. PATENT DOCUMENTS

| | | | | |
|---|---|---|---|---|
| 5,316,369 A * | 5/1994 | Kanda | .......................... | 297/217.3 |
| 6,317,928 B1 * | 11/2001 | Guillemette | ..................... | 16/380 |
| 8,496,290 B2 * | 7/2013 | Maier | ..................... | B60N 2/206 |
| | | | | 297/112 |
| 9,468,302 B2 * | 10/2016 | Negusse | | |
| 2015/0130249 A1 * | 5/2015 | Liew | ................... | B64D 11/0644 |
| | | | | 297/411.2 |

FOREIGN PATENT DOCUMENTS

DE     102020106034 A1 *  9/2021  ......... B64D 11/0644

* cited by examiner

*Primary Examiner* — Anthony D Barfield
(74) *Attorney, Agent, or Firm* — Pauley Erickson & Swanson

(57) ABSTRACT

An armrest assembly for seats on an aircraft includes a mount bracket and a leaf that is movable relative to the mount bracket. A hinge pin interacts with at least a portion of the mount bracket and the leaf. The leaf rotates about the hinge pin to raise and lower the armrest assembly.

15 Claims, 5 Drawing Sheets

PINCH POINT FREE ROTATABLE AIRCRAFT ARMREST

CROSS REFERENCE TO RELATED APPLICATION(S)

This application claims the benefit of U.S. Provisional Application Ser. No. 63/180,994, filed on 28 Apr. 2021. The provisional application is hereby incorporated by reference herein in its entirety and is made a part hereof, including but not limited to those portions which specifically appear hereinafter.

BACKGROUND OF THE INVENTION

Field of the Invention

This invention relates generally to an armrest and, more particularly, to a moveable armrest on an aircraft.

Description of Prior Art

Armrests are found on many types of chairs, as well as other seating areas. Movable armrests are found on seats of aircrafts, amongst other places. Many passenger planes utilize aircraft seats with armrests that rotate into a near vertical orientation. Raising the armrests provide a number of known advantages. Passengers can utilize two seats if desired or needed when the armrests are raised. Adjacent seats can be converted into a bench when the armrests are raised. Raised armrests make it easier for passengers to move into and out of their seats when the rows of seats are closely spaced. Servicing distressed passengers is also often easier when the armrests are raised.

Unfortunately, when an armrest is lowered or raised, multiple pinch points are encountered for most deployable aircraft seats. Typically, an external lower stop or interference provides a rigid armrest with a horizontal orientation. Unfortunately, such a rigid armrest also introduces pinch point hazards that can crush, bend, or shear a passenger's hand or arm.

Therefore, there is a continuing need for safer armrest assemblies that do not pose the pinch point hazards known to occur with armrest assemblies known in the art.

SUMMARY OF THE INVENTION

The invention generally relates to an armrest for seats on an aircraft.

The general object of the invention can be attained, at least in part, through an armrest assembly that includes a mount bracket, a leaf movable relative to the mount bracket, and a hinge pin that interacts with at least a portion of the mount bracket and the leaf.

The leaf includes a hinge knuckle. The hinge pin is inserted into the hinge knuckle. The leaf rotates about the hinge pin. The mount bracket includes at least one mount knuckle.

The mount bracket can include a first mount knuckle and a second mount knuckle. The first mount knuckle includes a circular bore. The hinge pin includes a first, circular end. The first, circular end of the hinge pin is inserted into the first mount knuckle. The second mount knuckle includes a non-circular bore. The hinge pin includes a second, non-circular end. The second, non-circular end of the hinge pin is inserted into the second mount knuckle.

The hinge knuckle of the leaf includes a slot. The hinge pin includes a stop post. The stop post protrudes from a surface of the hinge pin through the slot. The slot also includes a first stop and a second stop. The stop post can move within the slot between the first stop and the second stop. The leaf is movable between a predominantly vertical position and a predominantly horizontal position as the stop post moves between the first stop and the second stop.

The general object of the invention can also be attained through an armrest assembly that includes a stationary mount bracket attachable to hardware for a seat. The stationary mount bracket includes at least one knuckle. The armrest assembly also includes a movable leaf positioned adjacent to the at least one knuckle of the stationary mount bracket. The movable leaf includes a hinge knuckle complimentary to the at least one knuckle of the mount bracket. A hinge pin is also included in the armrest assembly. The hinge pin is integrated inside the hinge knuckle. At least a portion of the hinge pin protrudes from at least one side of the moveable leaf to interact with the at least one knuckle of the mount bracket.

The hinge knuckle is cylindrical and includes a slotted aperture around at least a portion of a circumference of the hinge knuckle. The slotted aperture includes a first stop and a second stop. The hinge pin includes a stop post protruding from a surface of the hinge pin through the slotted aperture. The leaf is rotatable about the hinge pin from a first position where the stop post is in contact with the first stop; and from a second position where the stop post is in contact with the second stop.

The hinge pin incudes at least one stop bolt protruding from a surface of the hinge pin through the slotted aperture. The at least one stop bolt interacts with at least one of the first stop and the second stop to control movement of the leaf between a first position and a second position. The at least one stop bolt includes a gasket sleeve around a perimeter of the at least one stop bolt. The gasket sleeve lessens a velocity of the leaf when the leaf is transitioned between the first position and the second position. The hinge knuckle of the leaf can also include a guard wrapped around at least a portion of the circumference on an outer surface of the hinge knuckle.

Other objects and advantages will be apparent to those skilled in the art from the following detailed description taken in conjunction with the appended claims and drawings.

DETAILED DESCRIPTION OF THE INVENTION

The present invention provides an armrest design that reduces or eliminates unprotected pinch points known in the prior art. The invention provides the use of interference stops that are internal to a hinge mechanism within the armrest. These interference stops provide stop points when an armrest achieves a slightly over center orientation or an almost horizontal orientation. Any would-be pinch points are isolated and protected by a fixed guard within an armrest assembly.

Thus, the invention provides a safer armrest assembly design, specifically for armrests for aircraft seating where armrests are frequently lowered and raised between a predominantly vertical and predominantly horizontal position.

Figure 1:
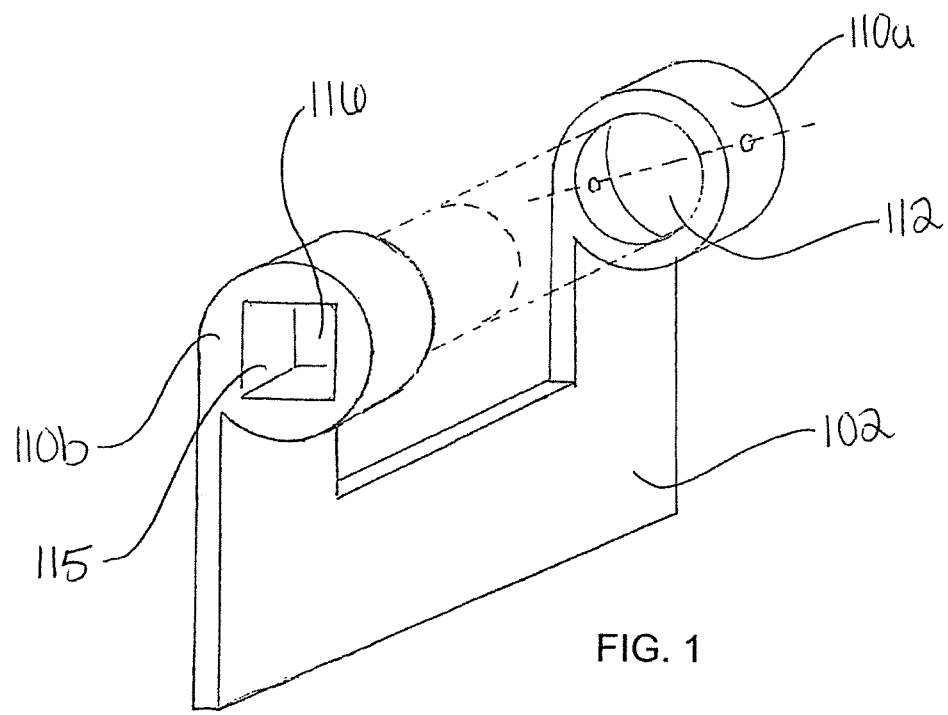
FIG. 1 shows a perspective view of a mount bracket for an armrest assembly according to one embodiment of the invention.

FIG. 1 shows a mount bracket 102 as part of an armrest assembly. The mount bracket 102 is stationary and can be incorporated into hardware of a standard airplane seat. The mount bracket 102 has at least one mount knuckle. The at least one mount knuckle can be a variety of shapes as a protrusion piece that extends from the mount bracket 102. As shown, the mount bracket 102 can have a first mount knuckle 110a and a second mount knuckle 110b. The mount knuckles can be fixed relative to a passenger deck of an aircraft.

The first mount knuckle 110a preferably protrudes from the mount bracket 102 via a circular bore 112. The first mount knuckle 110a essentially forms a ring positioned at a top of the mount bracket 102. The second mount knuckle 110b preferably protrudes from the mount bracket 102 via a non-circular bore 116. The outside of the second mount knuckle 110b resembles the outside of the first mount knuckle 110a. However, instead of forming a ring as mount knuckle 110a, the second mount knuckle 110b contains a non-circular through portion, such as the rectangular through portion 115 shown in FIG. 1. While a rectangular portion is shown here, the second mount knuckle 110b may include a wide variety of non-circular shapes such as, but not limited to, oval, triangular, diamond, and any other geometric shapes that may be positioned in an interior through portion of the second mount knuckle.

As shown, the first mount knuckle 110a and the second mount knuckle 110b are aligned on the same horizontal plane and vertical plane. As such, the through portions of each knuckle 112, 116 are aligned with one another.

Figure 2:
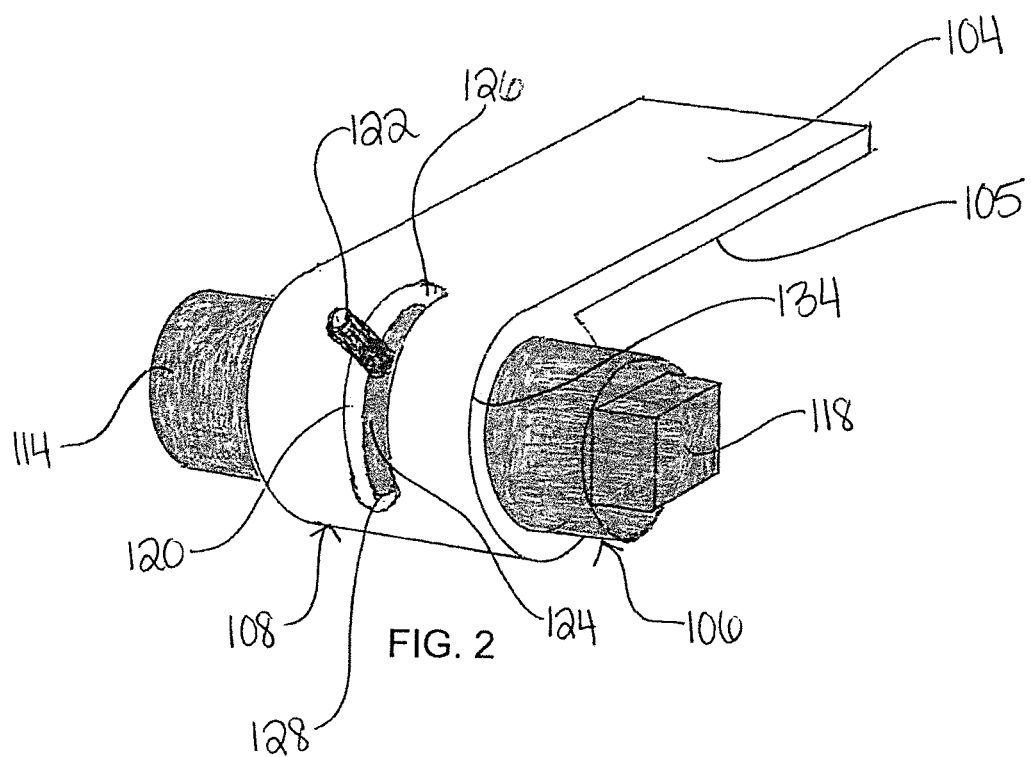
FIG. 2 shows a perspective view of a portion of an armrest assembly according to one embodiment of the invention.

FIG. 2 shows a leaf 104 as another portion of the armrest assembly. The leaf 104 has a hinge pin 106 that is inserted into a portion of the leaf 104. The leaf 104 generally includes a planar extension portion 105 and a hinge knuckle 108. The hinge pin 106 is inserted through the hinge knuckle 108 of the leaf 104. The hinge knuckle 108 has a slot 120 which is a slotted aperture along a portion of a circumference 134 of the hinge knuckle 108. In some embodiments of the invention, the hinge knuckle may have more than one slot along various portions of the knuckle.

The hinge pin 106 has a stop post 122 on a surface 124 of the hinge pin 106. The stop post 122 protrudes from the hinge pin 106, through the slot 120. The stop post 122 may be included as a part of the hinge pin 106, or the stop post 122 may be inserted through a hole (not shown) in the hinge pin 106. In embodiments where the stop post is fastened to the hinge pin, rather than a part of the hinge pin, the post may include an elongated island with dual fasteners.

The hinge pin 106 fits inside the hinge knuckle 108 so that the leaf 104 can rotate about the hinge pin 106. The slot 120 extends across the circumference 134 of the hinge knuckle from a first stop 126, to a second stop 128. The stop post 122 moves through the slot 120 as the leaf 104 rotates about the hinge pin 106. The stops 126, 128 limit the range of motion of the leaf 104 to a degree of rotation that exists from when the stop post 122 makes contact with the first stop 126, to when the stop post 122 makes contact with the second stop 128.

As shown, the hinge pin 106 extends outwardly past an end of the hinge knuckle 108. Primarily, the hinge pin 106 extends past one end of the hinge knuckle 108 to a first, circular end 114 of the hinge pin 106. The hinge pin 106 extends past another end of the hinge knuckle 108 to a second, non-circular end 118 of the hinge pin. These ends 114, 118 are of like size and shape so that these ends 114, 118 fit inside the through portions of the mount knuckles 110a, 110b on the mount bracket 102.

The first, circular end 114 of the hinge pin 106 shown in FIG. 2 is sized and shaped to fit inside the circular bore 112 of the first mount knuckle 110a shown in FIG. 1. The second, non-circular end 118 of the hinge pin 106 shown in FIG. 2 is sized and shaped to fit inside the non-circular bore 116 of the second mount knuckle 110b shown in FIG. 2. The hinge knuckle 108 of the leaf 104 therefore fits in a space between the first mount knuckle 110a and the second mount knuckle 110b.

As the non-circular bore 116 of the second mount knuckle 110b and the second end 118 of the hinge pin 106 are non-circular, once the hinge pin 106, leaf 104, and mount bracket 102 are assembled together, the second end 118 of the hinge pin 106 fits into the non-circular bore 116. This connection keeps the hinge pin 106 stationary with respect to the mount bracket 102. The hinge pin 106 is prevented from rotating.

As the bore 112 of the first mount knuckle 110a and the first end 114 of the hinge pin 106 are both circular, the first end 114 of the hinge pin 106 can more freely move when inserted into the first mount knuckle 110a. This allows for simpler assembly and adjustments as the mount bracket 102, leaf 104 and hinge pin 106 are assembled together.

Figure 3:
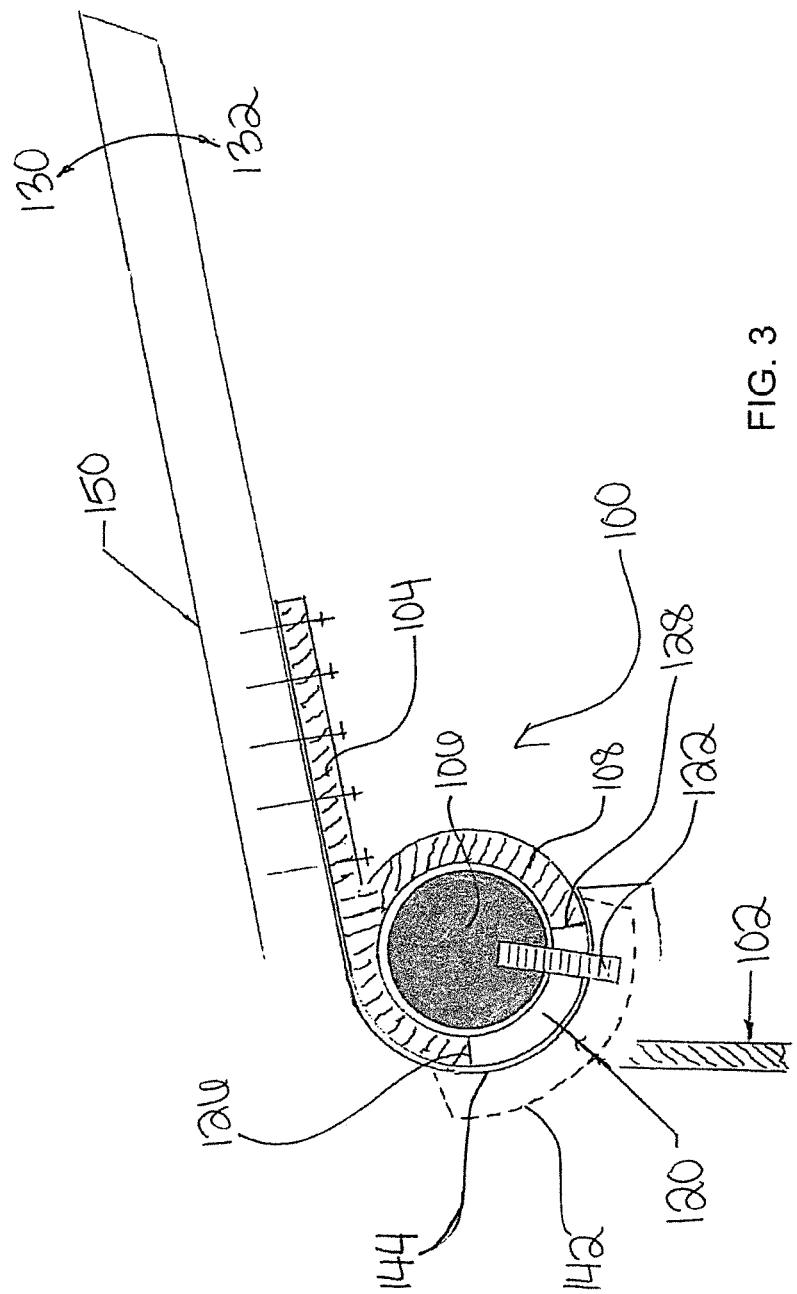
FIG. 3 shows a side, cross-sectional view of an armrest assembly according to one embodiment of the invention.

As the mount bracket 102, leaf 104 and hinge pin 106 are assembled together, these pieces create an armrest assembly 100 as shown in FIG. 3. FIG. 3 shows a cross-sectional view of the armrest assembly 100. This view includes a cross-section through a midplane of the hinge pin 106. The armrest assembly 100 includes the mount bracket 102, leaf 104, and hinge pin 106 assembled together. Basic armrest components, such as armrest upholstery generally designated as reference 150, are also shown in connection with the armrest assembly 100. The armrest upholstery 150 is positioned on top of the planar extension portion 105 of the leaf 104. Via, the armrest upholstery, the leaf 104, and therefore the entire armrest, can be maneuvered between a first, predominantly horizontal position 132, and a second, predominantly vertical position 130.

The stop post 122 ensures that the armrest does not go past the ideal horizontal and vertical positions 130, 132 and the movement of the leaf 104 is stopped in either direction when the stop post 122 reaches the first stop 126 when the armrest travels horizontally downward, and when the stop post 122 reaches the second stop 128 when the armrest travels vertically upward.

The post may be circular or non-circular depending on the desired velocity and range of motion of the armrest and its variable positions. For example, a post with a wider base (or wider diameter if the post is circular) in comparison to a width of the slot, can inhibit the overall range of motion of the armrest and/or lower the velocity of the armrest when the position of the armrest is moved. The slot may also be lined with an elastomeric material to provide rubbing resistance against the stop post.

Figure 4:
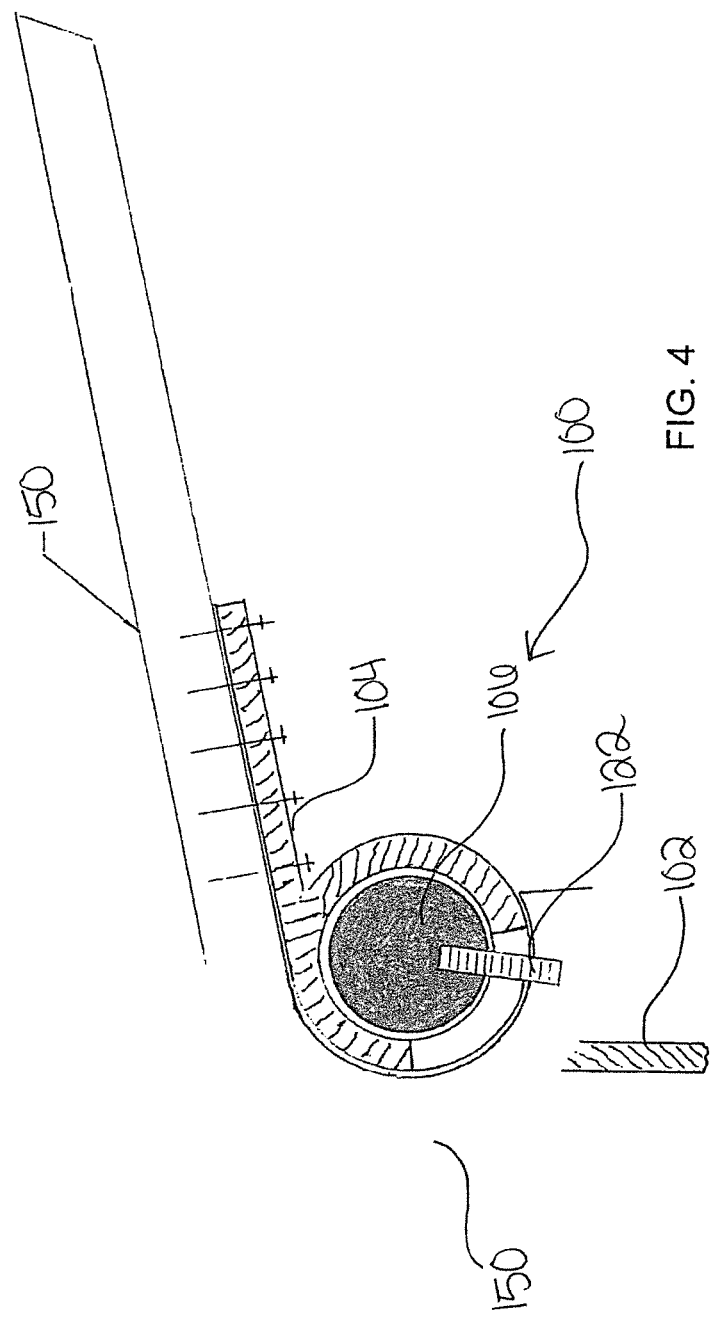
FIG. 4 shows a side, cross-sectional view of an armrest assembly according to one embodiment of the invention.

To accommodate for the protrusion of the stop post 122 in the armrest assembly 100, the assembly also includes a guard 142 that is wrapped around a portion of the circumference of an outer surface 144 of the hinge knuckle 108. The guard 142 can be a cavity within the upholstery 150 and protects possible pinch points created by the stop post 122. Additional armrest upholstery 150 may also be used to cover the outer surface 144 of the hinge knuckle 108 as shown in FIG. 4 as an additional option to conceal the hardware and movement of the stop post 122. In one embodiment the guard 142 is a metallic fixed guard that will enclose the region of the armrest assembly around the slot 120, therefore enclosing and shielding any pinch points from user access. The guard can also be located outside the armrest upholstery so that removal of the guard can allow for convenient service of armrest assembly components if needed.

Figure 5:
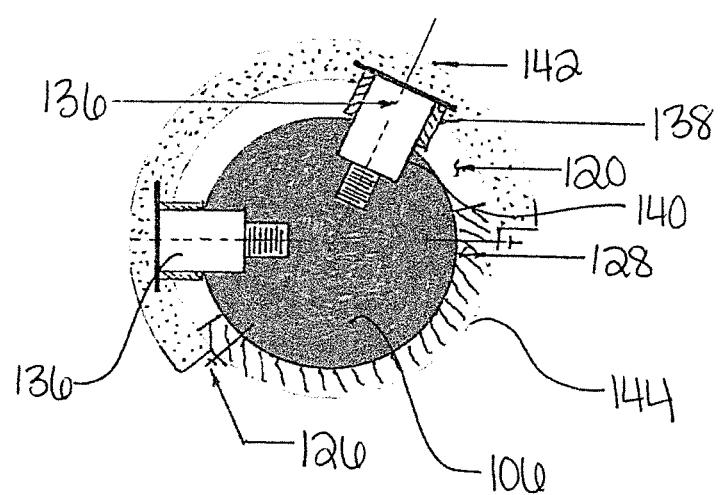
FIG. 5 shows a cross-sectional view of a portion of an armrest assembly according to one embodiment of the invention.

In one embodiment of the invention, as shown in FIG. 5, the hinge pin 106 includes at least one stop bolt 136 that protrudes from a surface of the hinge pin 106. The at least one stop bolt 136 protrudes through the slot 120. This embodiment preferably includes two stop bolts 136 as shown in FIG. 5, however different quantities may be used. The stop bolts 136 modify the range of motion of the hinge knuckle 108 as the hinge knuckle 108 rotates around the hinge pin 106. The stop bolts 136 make contact with the first stop 126 and the second stop 128 on the slot 120. The stop bolts 136 can optimally resist shear loads associated with the stop post in other embodiments.

On a portion of the stop bolts 136 that protrude out from the hinge pin 106, a perimeter 140 of the stop bolts 136 includes a gasket sleeve 138. The gasket sleeve 138 provides a cushion as the stop bolts make contact with the first and second stops 126, 128. This cushion lessens a velocity of the leaf when the leaf (and therefore the entire armrest) is transitioning between horizontal and vertical positions. The cushion of the sleeve also can provide rubbing resistance to stabilize the armrest in any orientation. The gasket sleeve 138 is preferably constructed from an elastomeric material such as nylon, although other suitable materials may be used. The sleeve 138 preferably fits tightly in the slot 120 to aid in stabilizing the armrest. Elliptical sleeves may also be used to provide rubbing resistance amongst the armrest assembly and can further aid in cushioning stopping action when the armrest is raised and lowered.

Figure 6:
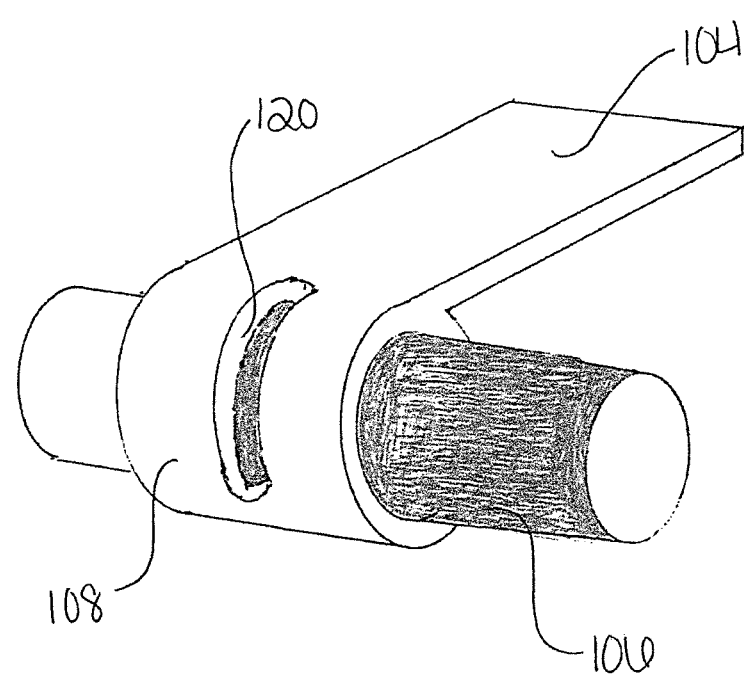
FIG. 6 shows a perspective view of a portion of an armrest assembly according to one embodiment of the invention.

FIG. 6 shows a leaf 104 with a hinge pin 106 according to one embodiment of the invention. In this embodiment the hinge pin 106 includes two circular ends where the entire hinge pin 106 is cylindrical. As shown, the hinge pin 106 can be pushed all the way through the hinge knuckle 108 before adding a post. A post and/or bolt can be added to the hinge knuckle through access to the slot.

The armrest assembly is ideally assembled by incorporating the assembly into the seat structure of passenger seats on an aircraft. The hinge knuckle of the leaf is aligned with the mount knuckles of the stationary mount bracket so that all three mentioned knuckles have a common centerline. The non-circular end of the hinge pin is then inserted into the knuckle assembly beginning at the first mount knuckle (with the circular bore), pushing the hinge pin through the knuckle assembly until the non-circular end of the hinge pin meets the non-circular bore of the second mount knuckle.

Once the hinge pin is properly inserted into the second mount knuckle, a hole in the hinge pin will be visible through the slot of the hinge knuckle. The stop post or bolt can then be driven into the surface of the hinge pin through the hole. The slot can then be covered with a guard before adding the desired upholstery to finish the armrest. Those skilled in the art can devise a system for vertically inserting the hinge pin into the knuckles with a bolted configuration as well, where the stop post or bolt(s) may be pre-assembled onto the hinge pin and the knuckles split horizontally to account for the posts/bolts.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An armrest assembly comprising:
    a mount bracket;
    a hinge knuckle rotatably movable relative to the mount bracket; and
    a hinge pin configured to enable rotation between the mount bracket and the hinge knuckle, wherein the hinge pin is inserted into the hinge knuckle, wherein the hinge knuckle comprises a slot, and wherein the slot further comprises a first stop and a second stop, wherein a stop post is configured to move within the slot between the first stop and the second stop.

2. The armrest assembly according to claim 1 wherein the hinge knuckle is configured to rotate about the hinge pin.

3. The armrest assembly according to claim 1 wherein the mount bracket comprises at least one mount knuckle.

4. The armrest assembly according to claim 1 wherein the mount bracket comprises a first mount knuckle and a second mount knuckle.

5. The armrest assembly according to claim 4 wherein the first mount knuckle comprises a circular bore.

6. The armrest assembly according to claim 5 wherein the hinge pin comprises a first, circular end, and wherein the first, circular end of the hinge pin is inserted into the first mount knuckle.

7. The armrest assembly according to claim 4 wherein the second mount knuckle comprises a non-circular bore.

8. The armrest assembly according to claim 7 wherein the hinge pin comprises a second, non-circular end, and wherein the second, non-circular end of the hinge pin is inserted into the second mount knuckle.

9. The armrest assembly according to claim 1 wherein the hinge pin comprises a stop post, wherein the stop post is configured to protrude from a surface of the hinge pin through the slot.

10. The armrest assembly according to claim 1 wherein the hinge knuckle is movable between a predominantly vertical position and a predominantly horizontal position as the stop post moves between the first stop and the second stop.

11. An armrest assembly comprising:
    a stationary mount bracket attachable to hardware for a seat, wherein the stationary mount bracket comprises at least one knuckle;
    a movable leaf positioned adjacent to the at least one knuckle of the stationary mount bracket, wherein the movable leaf comprises a hinge knuckle complimentary to the at least one knuckle of the mount bracket, wherein the hinge knuckle is cylindrical, and wherein the hinge knuckle comprises a slotted aperture around at least a portion of a circumference of the hinge knuckle, and wherein the slotted aperture comprises a first stop and a second stop; and a hinge pin integrated inside the hinge knuckle, wherein at least a portion of the hinge pin protrudes from at least one side of the moveable leaf to interact with the at least one knuckle of the mount bracket.

12. The armrest assembly according to claim 11 wherein the hinge pin comprises a stop post protruding from a surface of the hinge pin through the slotted aperture, wherein the leaf is rotatable about the hinge pin from a first position wherein the stop post is in contact with the first stop, and from a second position wherein the stop post is in contact with the second stop.

13. The armrest assembly according to claim 11 wherein the hinge pin comprises at least one stop bolt protruding from a surface of the hinge pin through the slotted aperture and wherein the at least one stop bolt interacts with at least one of the first stop and the second stop to control movement of the leaf between a first position and a second position.

14. The armrest assembly according to claim 13 wherein the at least one stop bolt comprises a gasket sleeve around a perimeter of the at least one stop bolt wherein the gasket sleeve dampens motion of the leaf when the leaf is transitioned between the first position and the second position.

15. The armrest assembly according to claim 11 wherein the hinge knuckle of the leaf comprises a guard wrapped around at least a portion of the circumference on an outer surface of the hinge knuckle.

\* \* \* \* \*